C. RADIGUER.
CONTROLLING DEVICE FOR TRANSMISSION GEARS.
APPLICATION FILED OCT. 29, 1913.
1,191,612.
Patented July 18, 1916.
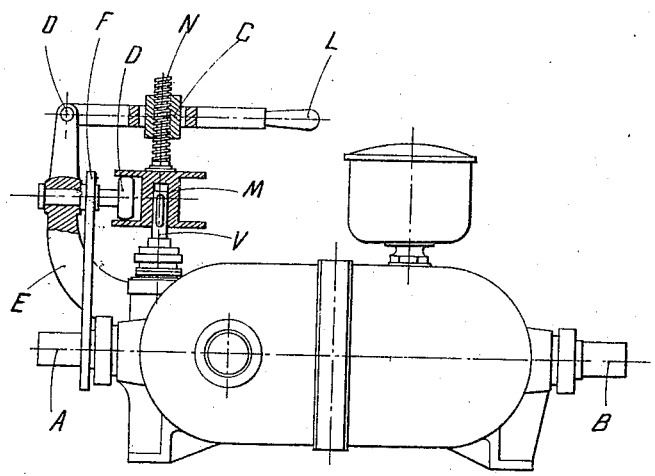
WITNESSES
INVENTOR

UNITED STATES PATENT OFFICE.

CHARLES RADIGUER, OF ST.-DENIS, FRANCE, ASSIGNOR TO THE SOCIETE ANONYME DES ETABLISSEMENTS DELAUNAY-BELLEVILLE, OF ST.-DENIS, FRANCE, A CORPORATION OF FRANCE.

CONTROLLING DEVICE FOR TRANSMISSION-GEARS.

1,191,612.     Specification of Letters Patent.     Patented July 18, 1916.

Application filed October 29, 1913. Serial No. 798,048.

*To all whom it may concern:*

Be it known that I, CHARLES RADIGUER, a citizen of the French Republic, residing at St.-Denis, Department of the Seine, in France, have invented certain new and useful Improvements in Controlling Devices for Transmission-Gears; and I do hereby declare the following to be a full, clear, and exact description of the invention, such as will enable others skilled in the art to which it appertains to make and use the same.

In variable speed hydraulic universal transmission a hand wheel or lever is acted upon in order to manipulate the members which determine the variation of the direction of rotation or the variation of the speed of rotation; the said wheel or lever rotating a rod projecting from the apparatus.

The present invention has for its object to simplify the manipulation of the controlling rod by substituting for the direct manual operation of this rod, a mechanical manipulation by an auxiliary motor necessitating a very small manual effort only and independent of both the power transmitted by the apparatus and the dimensions thereof.

The accompanying drawing refers to an adaptation of the invention to a universal transmission of the Janney type but the invention is applicable to any other kind of universal transmission controlled in the aforestated manner.

In the apparatus of the Janney type the manipulation of the controlling rod regulates by means of a screw, the inclination of a pivoted box and for each inclination of this box, there is a corresponding determined speed ratio between the driving shaft and the driven shaft.

The description of the device forming the object of the invention is given herewith: A sleeve M carrying two plates and terminated by a screw N is keyed upon the controlling screw V and is adapted to slide along the axis thereof. Between the two plates a friction roller D is provided the diameter of which is slightly less than the distance between the plates. This roller has its axis journaled in a fixed support E and is connected by means of a chain F with the constant speed shaft A which is coupled to the motor. The screw N is provided with a nut C; a hand lever L adapted to pivot about the point O prevents the nut C from rotating and permits of acting in both directions upon this nut in the direction of the axis of the screw. According to whichever direction the hand lever L is acted upon, the friction roller D is caused to contact with one or the other of the plates of the sleeve M and this sleeve is driven in one direction or the other and therewith the controlling screw of the apparatus. The pitch of the screw N is suitably selected so that it should be able to move in the nut C under the action of rotation of the sleeve M in a direction opposite to that in which the hand lever has been acted upon. Under these conditions, to every angular displacement of the lever L corresponds an angular displacement of the sleeve M; and as the latter is connected by means of a long key with the screw V which controls the speed and direction of rotation of the shaft B by the inclination of the pivoted box, a determined speed and direction of rotation will correspond to each position of the lever L. In particular, the stoppage of the driven shaft of the transmission will be effected by locating the lever L in a certain position which will be always the same.

I claim:

1. In a variable speed hydraulic transmission mechanism having a rotatable controlling rod, an actuated friction member keyed to said rod and comprising two spaced friction disks connected to rotate in unison, an actuating friction wheel disposed between said disks in a plane at right angles thereto and normally out of engagement with both of the disks, means to rotate said friction wheel, means to shift said actuated friction member to bring either of said disks into operative engagement with said friction wheel, and means to automatically move the actuated friction member back to its normal position after a predetermined rotation thereof.

2. In a variable speed hydraulic transmission mechanism having a rotatable controlling rod, an actuated friction member designed to rotate said rod and comprising two spaced friction disks connected to rotate in unison, an actuating friction wheel disposed between said disks in a plane at right angles thereto and normally out of engagement with both of the disks, means to rotate said friction wheel, and means to shift said actuated friction member to bring either of said disks into operative engagement with said friction wheel and thereby derive rotation therefrom.

3. In a variable speed hydraulic transmission mechanism having a rotatable controlling rod, an actuated friction member designed to rotate said rod and comprising two spaced friction disks connected to rotate in unison, an actuating friction wheel disposed between said disks in a plane at right angles thereto and normally out of engagement with both of the disks, means to rotate said friction wheel, means to shift said actuated friction member to bring either of said disks into operative engagement with said friction wheel and thereby derive rotation therefrom, and means automatically operable during the rotation of said actuated friction member to return the same to its normal position.

4. In a variable speed hydraulic transmission mechanism having a rotatable controlling rod, an actuated friction member designed to rotate said rod and comprising two spaced friction disks connected to rotate in unison, an actuating friction wheel disposed between said disks in a plane at right angles thereto and normally out of engagement with both of the disks, means to rotate said friction wheel from a constantly rotating part of the transmission mechanism, and means to shift said actuated friction member to bring either of said disks into operative engagement with said friction wheel and thereby derive rotation therefrom.

5. In a variable speed hydraulic transmission mechanism having a rotatable controlling rod, an actuated friction member designed to rotate said rod and comprising two spaced friction disks connected to rotate in unison, an actuating friction wheel disposed between said disks in a plane at right angles thereto and normally out of engagement with both of the disks, means to rotate said friction wheel, means to shift said actuated friction member to bring either of the disks into operative engagement with said friction wheel comprising a threaded extension on said actuated friction member, a nut designed to be engaged by the threads of said extension, and a pivoted lever designed to act upon said nut to shift said actuated friction member, whereby one of the friction disks is brought into operative engagement with the friction wheel and whereby the rotation of said threaded extension in the nut will restore the actuated friction member to its normal position.

In testimony whereof I affix my signature, in presence of two witnesses.

CHARLES RADIGUER.

Witnesses:
 HANSON C. COXE,
 EMILE KLOH.

Copies of this patent may be obtained for five cents each, by addressing the "Commissioner of Patents, Washington, D. C."